3,380,710
VALVE
Donald L. Pletcher, Bristol, and John D. Stalter, Elkhart, Ind., assignors to Nibco, Inc., Elkhart, Ind., a corporation of Indiana
Filed Feb. 28, 1966, Ser. No. 530,586
4 Claims. (Cl. 251—266)

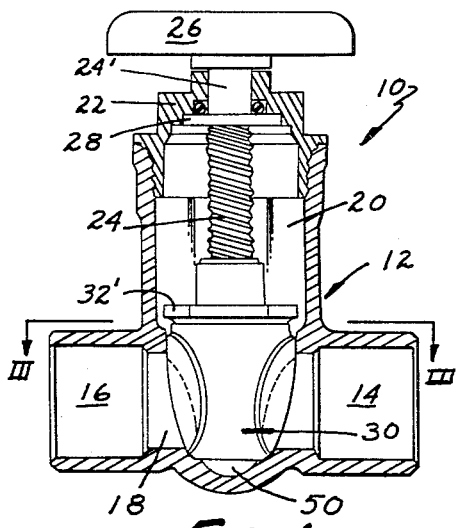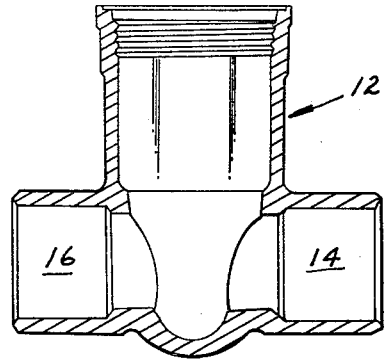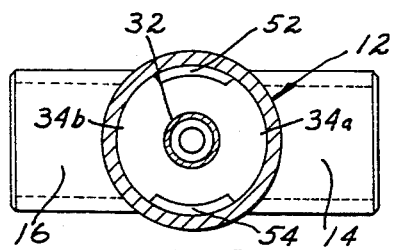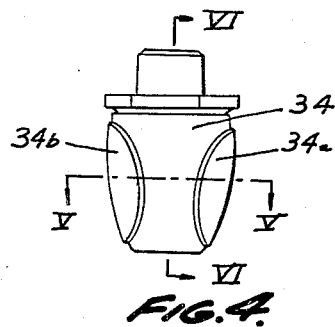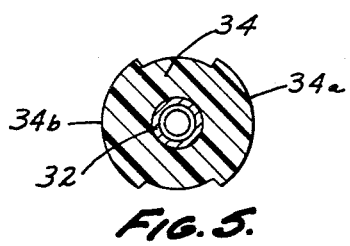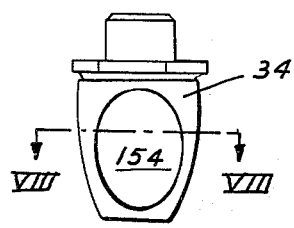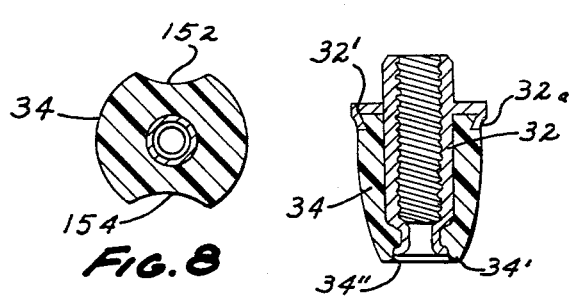
INVENTOR.
DONALD L. PLETCHER
JOHN D. STALTER
BY
ATTORNEYS

United States Patent Office 3,380,710
Patented Apr. 30, 1968

This invention relates to a fluid valve, and more particularly to a fluid valve having a unique plunger and valve seat relationship.

This invention is an improvement on that construction shown in U.S. Patent No. 3,217,735 assigned to the assignee herein.

The type of valve construction in the above identified patent has many advantages as set forth in detail in that patent. However, the valve in that patent does exhibit one characteristic which is considered by the assignee herein to be a disadvantage. More specifically, its useful life is relatively short, particularly in high pressure systems, because of the loss of complete sealing after a number of cycles. Upon discovering this fact, the inventors herein experimented with the valve extensively to determine the reason for loss of the absolute seal after a certain useful length of time. It was found that the rubber coat tends to absorb liquids from the pipeline system, and swell out of proper shape, and also tends to roll or deform progressively into a non-sealing configuration. Both of these factors contribute to the loss of complete sealing of the configurated rubber plunger coating against the likewise configurated valve seat surface between the valve passages.

After determining this, the inventors herein decided to modify the structure to try to eliminate this. Firstly, different materials were employed for the coating. It was concluded that a non-deforming, non-absorbing, non-swelling, polymeric material having excellent wear and lubricious characteristics should be employed as a configurated jacket on the plunger, particularly Teflon (polytetrafluoroethylene). However, Teflon does not ordinarily bond to metal and this raised an immediate problem. Further, it was found that when a special structure was devised so that Teflon could be applied as a jacket, it was so rigid in character due to its small resilient compressibility i.e. "give," that tremendous rotational force had to be applied to the valve handle and stem in order to get the configurated Teflon jacket to completely seal against the likewise configurated valve seat surface.

The inventors herein therefore developed a special valve assembly enabling a hard rigid non-swelling, non-absorbing material such as Teflon to be employed on the plunger for a long useful life, and to also be able to obtain a complete seal between the configurated Teflon jacket on the plunger and the cooperative valve seat region in the valve body.

The chief object of this invention therefore is to provide a valve construction having a plunger with non-absorbing, non-swelling, non-deforming characteristics, particularly a Teflon jacket, to obtain an extended useful life of the valve, but one which is also capable of forming a complete seal between the plunger and the valve seat region of the valve body with only normal closing force rather than excessive force being required, with this proper sealing action being obtainable between the Teflon and the metal seat because of a special interfitting relationship between these two components. Particularly, the construction causes a pair of special ring type, limited, controlled engagements between the Teflon jacket and the valve body, with a special recess between the rings.

Another object of this invention is to provide a novel valve construction enabling a relatively rigid, non-absorbing, non-swelling, configurated jacket material such as Teflon having only slight resilient compressibility to be used and also to be capable of a complete seal, because of a special configuration of the valve seat region of the valve body.

Another object of this invention is to provide a novel valve assembly enabling a Teflon plunger jacket to be employed on the plunger because of a unique attachment of the jacket to the plunger core.

These and other objects of this invention will become apparent upon studying the following specification in conjunction with the drawings in which:

FIG. 1 is a side elevational sectional view of the novel valve assembly, taken through the center of the valve body, and showing the valve in its closed position;

FIG. 2 is a side elevational sectional view of only the body of the assembly in FIG. 1;

FIG. 3 is a sectional view taken on the plane III—III of FIG. 1;

FIG. 4 is a side elevational view of the first form of the plunger in the assembly in FIGS. 1 and 3;

FIG. 5 is a sectional view taken on plane V—V of FIG. 4;

FIG. 6 is a sectional view taken on plane VI—VI of FIG. 4;

FIG. 7 is a side elevational view of a modified plunger; and

FIG. 8 is a sectional view taken on plane VIII—VIII of FIG. 7.

Referring now specifically to the drawings, the complete valve assembly 10 there shown includes a valve body 12 which defines a through flow passageway including an inlet passage 14, an outlet passage 16 and a valve seat region 18 therebetween. The valve body 12 also forms an elongated chamber 20 generally on one side of the valve seat region, transverse to the passageway, and intersecting the valve seat region. Closing off the open end of chamber 20 is a bonnet 22 which is threadably connected to internal threads in hollow chamber 20. It has an elongated opening extending therethrough to receive the upper cylindrical end 24' of a threaded stem 24. The end 24' of the stem extends out of the bonnet and has a handle 26 mounted thereon. On the underside of bonnet 22 is a disc 28 fitted around the stem. This disc and handle 26 holds stem 24 in one particular axial position when the stem and handle are rotated. Axial movement of valve plunger assembly 30 on this threaded stem is obtained by a threaded connection between the stem and the internal threads of the hollow core member 32 (FIG. 6) of the plunger assembly.

This plunger assembly 30 is basically composed of this hollow core 32 and a special configurated jacket 34. The core includes a peripheral flange 32' at one end of the elongated jacket, and has its other end extending through the jacket to a position almost flush with the nose end 34' of jacket body 34. Flange 32' interfits with chamber 20 in a manner to prevent the plunger from rotating when it is axially shifted with respect to stem 24. This is done by having both the flange and the chamber inner wall of matching non-circular configurations, such as the hexagonal configuration shown.

The specially configurated jacket body 34 of the plunger is formed of material having lubricious, non-absorbing, non-swelling, relatively hard and rigid properties with good wear characteristics, but having a small amount of resilient compressibility. The material preferably is Teflon, i.e. polytetrafluoroethylene. The plunger and jacket are symmetrical in configuration with respect to a vertical plane passed through the plunger assembly from one side to the other. The basic portion of the jacket generally has an elongated, slightly tapered configuration resembling that of a truncated cone. It includes a central opening extending its entire length to enable it to be fitted on the elongated core 32, with the larger diameter end fitted flush against flange 32'. The smaller diameter end of the structure has an enlarged recess 34" inside annular nose 34', adjacent the end of core 32. Jacket 34 is attached to the core by deforming this end of the core adjacent nose 34' as by spinning the end radially outwardly into recess 34" and tightly against the jacket, and by crimping portion 32a of flange 32' around a peripheral portion of the opposite end of the jacket. If desired, the curvature of the elongated jacket along its length may be increased so that the overall configuration tends to depart from that of a generally truncated cone to approach more of a spherical configuration.

As shown in FIG. 4 of prior Patent 3,217,735 referred to above, the valve seat surface of the prior construction was formed with a configuration to exactly match the complete configuration of the rubber coat on the valve plunger. However, it has been found that when Teflon is used for the outer jacket, as in this application, to obtain the non-swelling, lubricious, non-absorbing and good wear characteristics, the Teflon has such a small amount of resilient compressibility that sealing can only be obtained between such matched surfaces if tremendous force is applied to the handle and stem. The inventors herein devised a particular type of novel interfitting relationship between the Teflon plunger jacket and the valve seat region by specially configurating the plunger periphery, so that a proper seal can be obtained with only normal closing force. This is done by limiting the sealing or contacting engagement between the plunger periphery and the valve seat region to specific controlled small areas, with special recess means being formed between these areas so that the Teflon can bulge into the recess means and thereby obtain sufficient compressing deflection to produce an effective seal. Engagement is limited to two annular rings surrounding the inlet and outlet passages.

The limited engagement is obtained by forming the plunger jacket with a special configuration so that it will have two engagement areas with the passages, and recess means therebetween. More specifically, in the first form of the plunger construction shown in FIGS. 1, 3, 4, 5 and 6, the main body 34 of the plunger includes a pair of configurated opposite surface embossments 34a and 34b protruding uniform amounts from the surface of body 34. They have an outer configuration like that of the annular seat portions around passages 14 and 16, to form matching engagement therewith.

The valve body 12 is preferably formed with a slight outer protrusion opposite the portion forming chamber 20, to form an inner recess 50 adjacent the nose 34' of the plunger. This recess area connects the lateral recesses 52 and 54 formed between the embossments 34a and 34b (FIG. 3) so that a generally U-shaped recess means is formed extending down one side of the valve body and plunger, across the nose of the plunger, and up the opposite side of the valve body and plunger, thereby forming areas into which the Teflon material protrudes slightly when the valve is closed, to accentuate the contact engagement between the embossments and the annular curved rings around the ends of passages 14 and 16.

Instead of the jacket embossment configuration shown in these first figures, a similar action may be obtained by forming recesses 152 and 154 into the opposite sides of the jacket body 34 as shown in FIGS. 7 and 8. Limited engagement occurs between the valve seat rings surrounding passages 14 and 16, and the jacket material.

In both of these variations, the protruding portions of the jacket are maintained in alignment with the passages, when the valve is opened and closed, since the plunger itself, although moving axially, does not rotate with the threaded stem.

Additional advantages to those specifically noted herein may occur to those in the art upon studying the foregoing description and drawings. It is also conceivable that certain minor deviations in construction may be made within the concepts presented. Hence, the invention is intended to be limited only by the scope of the appended claims and the reasonable equivalent structures to those defined therein.

We claim:

1. In a valve assembly having (1) a valve body with a through flow passageway including an inlet passage and an outlet passage and a valve seat region therebetween, said body also forming a chamber located generally on one side of said valve seat region and intersecting said valve seat region; (2) a bonnet on said body at said chamber with a stem carried thereby and extending into said chamber; and (3) a valve plunger threadably connected to said stem and movable axially and non-rotationally from said chamber into said valve seat region for closing the flow passageway; the improvement comprising: said valve plunger having a core and an outer lubricious, resilient, polymeric, non-absorbing, and non-swelling jacket of relatively low compressibility attached to said core; and said jacket being configurated to protrude toward both said inlet and outlet passages and having recess means down both sides to the bottom thereof, to engage said valve body in said valve seat region only around the peripheries of said inlet and outlet passages.

2. The valve assembly in claim 1 wherein: said jacket is elongated and gradually varies in size from a larger end adjacent said stem to the other end, and includes a pair of configurated bosses protruding toward said inlet and outlet passages to form sealing engagement around said passages.

3. The valve assembly in claim 1 wherein said jacket is elongated and includes a pair of indentations on opposite lateral sides thereof.

4. The valve assembly in claim 1 wherein said jacket is Teflon.

References Cited

UNITED STATES PATENTS

| | | | |
|---|---|---|---|
| 2,868,499 | 1/1959 | Kaminsky | 251—368 X |
| 2,893,687 | 7/1959 | Huthsing | 251—368 X |
| 2,914,258 | 11/1959 | Ruetsch | 251—368 X |
| 3,217,735 | 11/1965 | Stalter | 251—266 X |

ALAN COHAN, *Primary Examiner.*

DAVID R. MATTHEWS, *Assistant Examiner.*